United States Patent [19]

Sidner et al.

[11] Patent Number: 4,993,143
[45] Date of Patent: Feb. 19, 1991

[54] METHOD OF MAKING A SEMICONDUCTIVE STRUCTURE USEFUL AS A PRESSURE SENSOR

[75] Inventors: Diane W. Sidner, Noblesville; Douglas J. Yoder, Sharpsville; David E. Moss, Kokomo, all of Ind.

[73] Assignee: Delco Electronics Corporation, Kokomo, Ind.

[21] Appl. No.: 488,349

[22] Filed: Mar. 27, 1990

Related U.S. Application Data

[62] Division of Ser. No. 319,023, Mar. 6, 1989, Pat. No. 4,945,769.

[51] Int. Cl.[5] .............................. G01L 7/08; G01L 9/06
[52] U.S. Cl. ...................................... 29/621.1; 73/727; 156/651; 156/357; 156/662; 338/4
[58] Field of Search ................ 29/454, 621.1, 595, 29/610.1; 73/727, 721, DIG. 4; 338/4; 156/651, 657, 662

[56] References Cited

U.S. PATENT DOCUMENTS

| | | | |
|---|---|---|---|
| 4,766,666 | 8/1988 | Sugiyama et al. | 29/610 |
| 4,771,638 | 9/1988 | Sugiyama et al. | 73/721 |
| 4,823,605 | 4/1989 | Stein | 73/706 |
| 4,945,769 | 8/1990 | Sidner et al. | 73/727 |

Primary Examiner—Donald O. Woodiel
Attorney, Agent, or Firm—Robert J. Wallace

[57] ABSTRACT

A pressure sensor uses a monocrystalline silicon chip that has a diaphragm portion in which strain gages are formed that overlie a buried cavity. The cavity is formed by a single sided semiconductor fabrication process that includes a pair of preferential etching steps and an epitaxial deposition step.

8 Claims, 2 Drawing Sheets

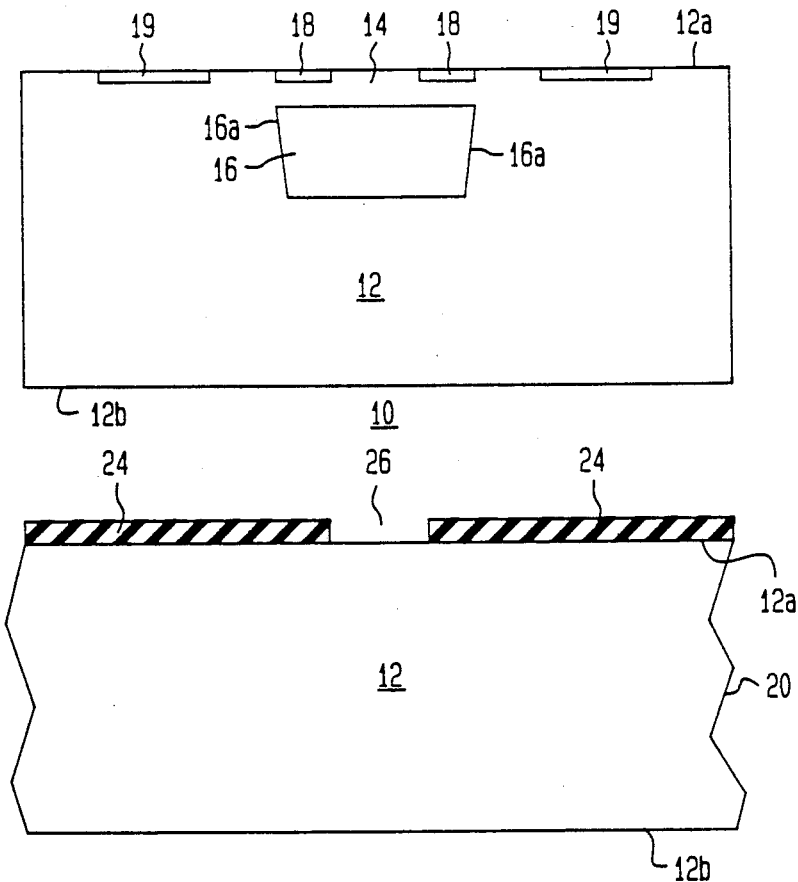
FIG. 1
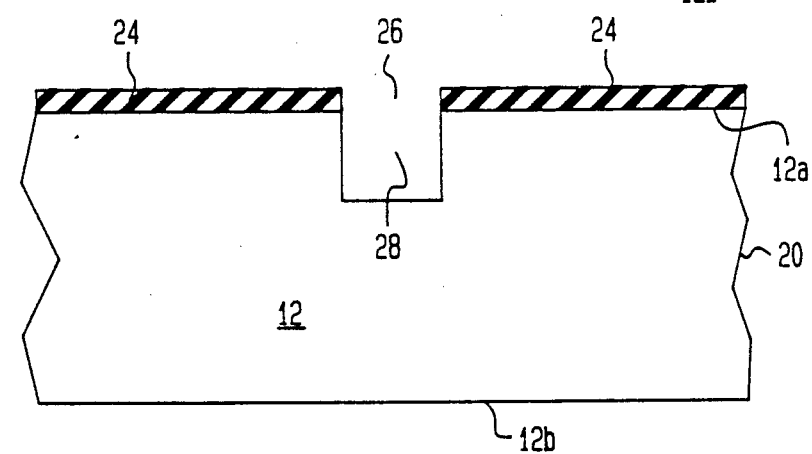
FIG. 2A
FIG. 2B
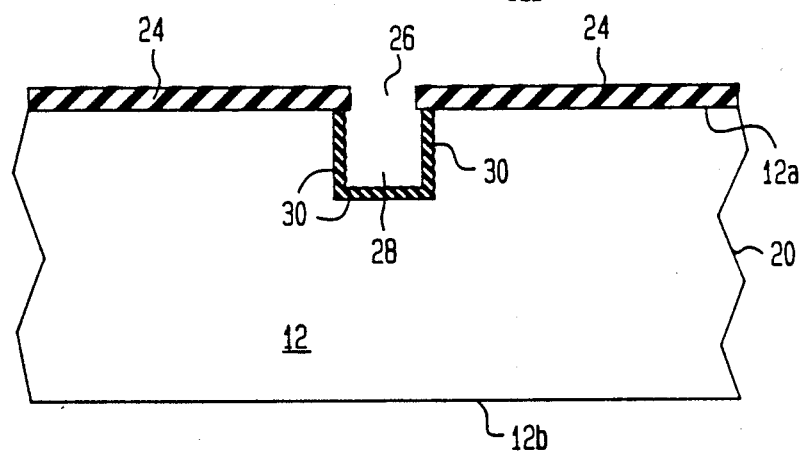
FIG. 2C

METHOD OF MAKING A SEMICONDUCTIVE STRUCTURE USEFUL AS A PRESSURE SENSOR

This is a division of application Ser. No. 07/319,023 filed on Mar. 6, 1989, now U.S. Pat. No. 4,945,769.

FIELD OF THE INVENTION

This invention relates to a semiconductor technology, particularly to a semiconductive chip that includes a diaphragm portion overlying a cavity portion and more particularly to a semiconductive pressure sensor that includes such a semiconductive chip.

CROSS-REFERENCED PATENT APPLICATIONS

This application is related to our co-pending U.S. patent application Ser. No. 07/318,887, entitled, "Semiconductive Stalk Structure," filed Mar. 6, 1989, and which has a common assignee.

BACKGROUND OF THE INVENTION

Semiconductive pressure sensors are now in widespread use. A common form includes a semiconductive chip, typically of silicon, that includes a thin membrane or diaphragm at one of its two major surfaces, formed by etching a cavity in the opposite other major surface. One or more piezoresistive strain gages (typically piezoresistors) are formed in the diaphragm to sense changes in stresses as the diaphragm is exposed to the pressure being sensed. The sensor may be either of the absolute type, in which the pressure on one side of the diaphragm is maintained at a reference value, or of the differential type, in which the pressures on opposite sides of the diaphragm vary independently and their difference is measured. It is also advantageous in such sensors to include in the semiconductive chip additional circuitry to process the relatively weak signals detected by the strain gages into stronger signals for more convenient use in the control system of which the pressure sensor generally is part.

For various well-recognized reasons, including greater sensitivity and better reproducibility, it is advantageous that the piezoresistive strain gages be formed in monocrystalline semiconductive material. To this end, it is the usual practice for the semiconductive chip that houses the strain gages and the additional circuitry to be monocrystalline.

Hitherto, to form a semiconductive chip that includes a diaphragm that is monocrystalline, the practice has been to start with a monocrystalline semiconductive chip of uniform thickness and to form the thin diaphragm on one surface by thinning the chip locally by etching a cavity in the opposite surface of the semiconductive chip.

It is recognized that such two-side processing has some serious disadvantages. In particular, because the final thickness of the diaphragm is determined by the small difference of two larger values, the process needed to insure a prescribed diaphragm thickness tends to be difficult.

Accordingly, it has been recognized that it would be advantageous to have a single-sided processing method in which all of the critical processing steps are conducted solely on the same surface of the semiconductive chip that houses the strain gages.

A single-sided process has been described in U.S. Pat. No. 4,766,666 that issued on Aug. 30, 1988. However, it is characteristic of the process described therein that it results in a diaphragm that is polycrystalline with the subsequent disadvantages that such a structure entails.

SUMMARY OF THE INVENTION

The present invention is directed to a single-sided process for forming a pressure sensor in a monocrystalline semiconductive chip (body) including a diaphragm, in which strain gages (pressure sensitive) devices, e.g., piezoresistors) are formed, and to the product of such process. The chip is typically a portion of a semiconductive wafer which comprises a plurality of identical chips in which pressure sensors are simultaneously formed.

To this end, in one aspect the invention is a process in which:

a monocrystalline wafer, typically of silicon, having two opposed planar surfaces, is provided on one of such surfaces with a thin layer of a suitable masking material;

a small hole is formed in the masking layer to expose the underlying silicon surface at each location where it is desired to center a diaphragm portion in the silicon wafer;

a moat having initial side walls and a bottom surface is formed in the wafer at each hole in the mask by an etchant that preferably etches faster in the vertical (thickness) direction of the wafer than in the lateral direction;

the wafer is treated to form an oxide layer over the surface of each moat, including the initial side walls and the bottom surface;

the oxide layer is selectively removed from the bottom surface of the moat while leaving it along the original side walls;

the wafer is treated to etch selectively exposed semiconductive material such that the moat is deepened beyond the initial side walls and such deepened portion has lateral dimensions wider than those between the initial side walls;

the oxide layer on the initial side walls of each moat is removed;

epitaxial monocrystalline semiconductive material is grown through each hole in the masking layer under conditions that favor lateral epitaxial growth as opposed to vertical epitaxial growth whereby the epitaxial material grown closes each moat selectively in an upper region between its initial side walls, leaving the deepened portion unfilled to form a buried cavity over which lies a thin layer of monocrystalline epitaxial material that serves as part of a diaphragm layer;

one or more strain gages (pressure sensitive devices) are formed in each such diaphragm layer and additional circuitry is formed in the surrounding portions of the wafer; and the wafer is divided into a plurality of chips, each including a diaphragm portion.

For use as a pressure sensor, piezoresistive strain gages (typically piezoresistors) are formed in each diaphragm portion of individual chips before such division.

Semiconductive devices, such as lateral bipolar transistors, may be substituted for the strain gages, to provide an integrated circuit other than a pressure sensor.

In another aspect the invention is directed to a pressure sensor comprising a monocrystalline semiconductive chip including within its bulk an enclosed buried cavity part of chip whose lateral extent defines one surface of an overlying diaphragm layer which includes an epitaxial monocrystalline portion and which extends to a first surface of the chip; and means forming at least one pressure sensitive device in said diaphragm portion of the chip.

The invention will be better understood from the following more detailed description taken with the accompanying drawing.

BRIEF DESCRIPTION OF THE DRAWING

FIG. 1 shows, in cross-section, a pressure sensor in accordance with one embodiment of the invention; and FIG. 2A through 2G show, in cross section, the pressure sensor of FIG. 1 at succeeding stages of fabrication.

Figure 2D:
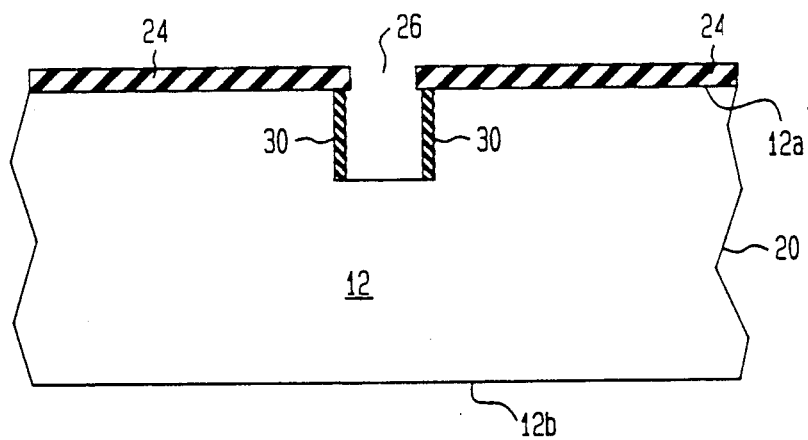

It is to be noted that the figures are not shown to scale and back lines have been omitted.

DETAILED DESCRIPTION

Referring now to FIG. 1, there is shown a pressure sensor 10 that comprises a monocrystalline semiconductive chip (body) 12, illustratively of silicon, in accordance with the invention. The silicon chip 12 has a top surface 12a which forms part of a diaphragm portion 14 that overlies a sealed and buried cavity 16 formed in the interior of the silicon chip and having side walls 16a. In one illustrative embodiment the diaphragm portion 14 has a thickness of between about 10 microns and lateral dimensions of about 20 microns square. The chip 12 typically has a thickness of 25 mils and lateral dimensions of tens of mils square. The height of the cavity 16 is typically several times the thickness of the diaphragm portion 14 and its lateral dimension are essentially those of the diaphragm portion 14 that it defines. Typically the thickness of the diaphragm portion 14 is between about 1 and 10 microns and the lateral dimensions are between about 10 to 100 microns square.

Advantageously, the top surface 12a of the chip 12 lies along a <100> crystal plane and the sidewall walls 16a of the cavity 16 correspond to <111> crystal planes.

Semiconductive body 12 and diaphragm portion 14 are typically of p-type conductivity with an impurity concentration of about $2 \times 10^{15}$ atoms/cm$^3$.

One or more strain gages 18, typically four piezoresistors, are formed in the diaphragm portion 14 for connection into a respective arm of a suitable bridge, such as the four arms of a Wheatstone bridge. Also, at the top surface 12a surrounding the diaphragm portion 14, are additional circuit elements 19 which are formed for inclusion with the strain gages in an integrated circuit suitable for a particular function to be served by the pressure sensor 10. Since the invention is independent of the particular function to be served, and various such functions are well known, details of such circuitry are not shown or described herein.

The piezoresistive strain gages 18 and the circuit elements 19 generally comprise localized regions of particular conductivity and conductivity type, typically formed by selective implantation or diffusion of appropriate impurity ions, and interconnected by conductive patterns (not shown) over the front surface 12a of the chip 12.

If the pressure sensor 10 is to be of the absolute type, the cavity 16 is completely sealed so that the pressure within the enclosed cavity 16 remains essentially independent of the pressure of the ambient. If the pressure sensor 10 is to be of the differential type, provision can be made to vary the pressure within the cavity 16, as by including a passage (not shown) to a back surface 12b of the chip 12 so that there can be sensed the difference in pressures at the top 12a and bottom 12b surfaces of the chip 12. Such a cavity 16 may be denoted as an enclosed and buried (or enclosed buried) cavity.

Referring now to FIG. 2A, there is shown a monocrystalline wafer 20, typically of lateral dimensions large enough to encompass a large number of individual silicon chips 12 of the kind shown in FIG. 1, with only the portion of one chip 12 shown. As is well known, for manufacturing efficiency, it is generally the practice to process such a large wafer 20 and subsequently to dice the wafer 20 into one or more individual chips 12 for separate packaging. In the subsequent discussion, the description will focus on the formation of a single pressure sensor in the wafer portion shown.

The wafer 20 includes a top (front) surface 12a a layer 24 of a suitable masking material, such as silicon dioxide or silicon nitride or a combination of a layer of silicon dioxide and silicon nitride, that is relatively unaffected by the etchant subsequent to be used to etch the cavities 16 in the silicon wafer 20. The layer 24 typically is 1 micron thick and can be provided in any known fashion. The layer 24 is provided with an opening (aperture) 26, localized where the diaphragm portion 14 is to be formed, to expose underlying silicon of the wafer 20. The size of the opening typically is about 1 micron square. The smaller the opening the easier it will be later to close the opening by the lateral growth of epitaxial material. This favors making the hole small. However, the hole should be large enough to permit the formation of the desired enclosed buried cavity 16 conveniently.

Thereafter, the wafer 20 is subjected to an etch that advantageously etches preferentially in the vertical (depth) direction through the hole 26 with little etching along the horizontal (lateral) direction and consequently little undercutting of the masking layer 24.

Referring now to FIG. 2B, there is shown the result, with a moat 28 formed at the top surface 12a of the wafer 20. The moat 28 advantageously has a depth of between 5 and 20 microns and lateral dimensions only slightly larger than those of the opening 26. Various techniques are known for such preferential etching. One such treatment involves etching in a reactor, evacuated to a pressure of 50 Torr and at a temperature of 1000° C., through which flows a gaseous mixture of HCl (hydrochloric acid) and H$_2$ (hydrogen), typically in a ratio of 3 liters of HCl to 60 liters of H$_2$, to achieve a vertical etch rate of about 0.5 microns per minute. It is known that in an etching system of this kind the ratio of the etching rate in the horizontal direction to that in the vertical direction can be controlled by the ratio of hydrogen to hydrochloric acid in the gaseous etching medium as well as pressure and temperature.

Thereafter, the wafer 20 is exposed in known fashion to an oxidizing ambient for a time and at a temperature to grow an oxide layer 30, typically 1000–2000 Angstroms thick, over the surface of the side walls and bottom of the moat 28, as is shown in FIG. 2C. The oxide layer 30 is typically silicon dioxide.

Then the wafer is treated in known fashion to an anisotropic plasma etch that removes the oxide layer at the bottom of the moat 28 to bare there the underlying silicon with little effect on the oxide layer 30 along the side walls of the moat 28. If the masking layer 24 is of a material affected by the plasma etch, its original thickness should be sufficient that enough remains for it to continue to serve as a masking layer. Illustratively, this etching operation can use an etch in a known fashion, such as anisotropic plasma etching to bare silicon at the bottom of moat 28. The result is shown in FIG. 2D.

Figure 2E:
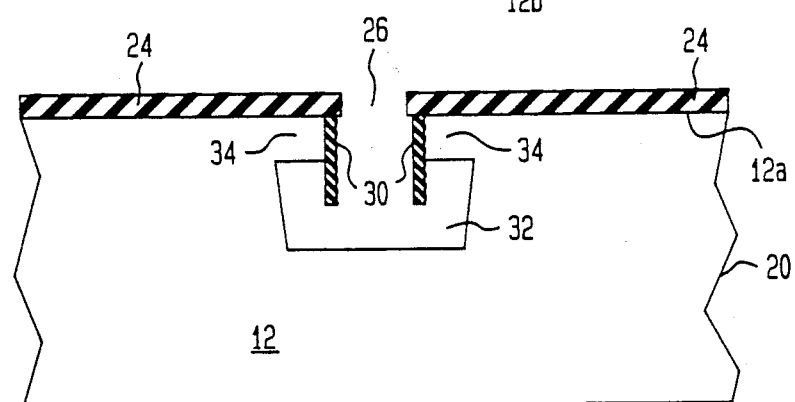

Next the wafer 20 is exposed to a gaseous etchant that has an etch rate in the lateral direction greater than in the vertical direction. This serves to deepen the moat 28, but in addition there is also some upward etching towards the surface 12a. The etching is continued advantageously to etch upwards between ⅓ and ¼ of the distance to the surface 12a to create a neck portion 34 about 10 microns high while widening the moat 28 to about 20 microns square. The result is the buried open cavity 32 shown in FIG. 2E.

The lateral dimensions of the cavity 32 determine the dimensions of the overlying diaphragm portion 14 shown in FIG. 1.

This etching can be performed in the same reactor used to etch the moat 28 simply by changing the etching conditions. Typically in this etching the reactor is kept at atmospheric pressure and at 1200° C., while the gas flow mixture is kept at a ratio of 60 liters of HCl to 80 liters of $H_2$ to achieve a vertical etch rate of about 10 microns per minute. Advantageously, the added depth of the etching is limited to between ¼ and ⅓ the original depth of moat 28 to insure adequate thickness of the remaining overlying diaphragm portion 34.

Figure 2F:
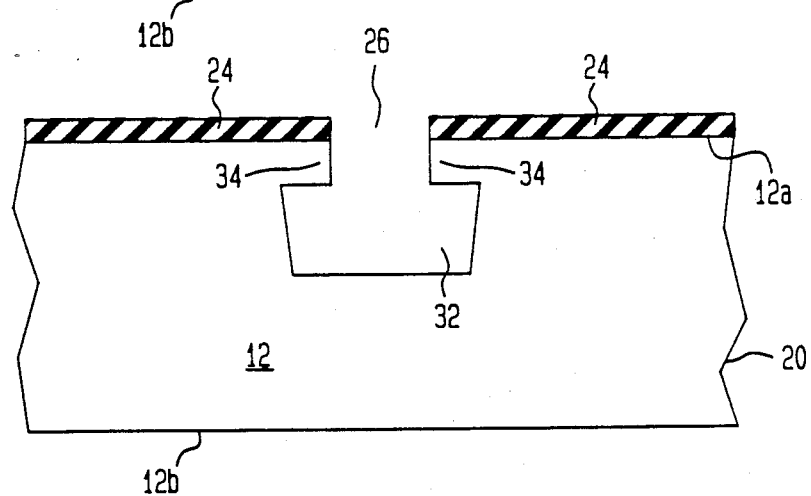

Next, the oxide layer 30 remaining in the side walls of the original moat 28 is removed by a suitable wet etch, such as a fifty-to-one $H_2O$/HF mixture. The resultant is shown in FIG. 2F. As seen, the buried open cavity 32 includes the intact (unwidened) neck portion 34 whose lateral dimensions essentially are those of the hole 26 in the masking layer 24.

Next, the wafer 20 is exposed to an ambient suitable for the growth of epitaxial monocrystalline silicon laterally within the neck portion 34 to fill it and thus define a sealed and buried (or sealed buried) cavity 16. The deposition conditions are chosen to favor lateral growth rather than vertical growth so that the neck opening 34 can be filled without materially affecting the remainder of cavity 16. Typical conditions for such deposition are 950° C., 50 torr pressure, 80 liters/minute $H_2$, 3.6 liters/minute HCl and 1.8 liters/minute dichlorosilane.

In some instances it may proves advantageous to improve the quality of the crystal structure in the diaphragm portion deposited by known laser melt and regrowth techniques. By including such a technique there may be formed monocrystalline diaphragm portions of larger area than might otherwise be conveniently grown without it.

Figure 2G:
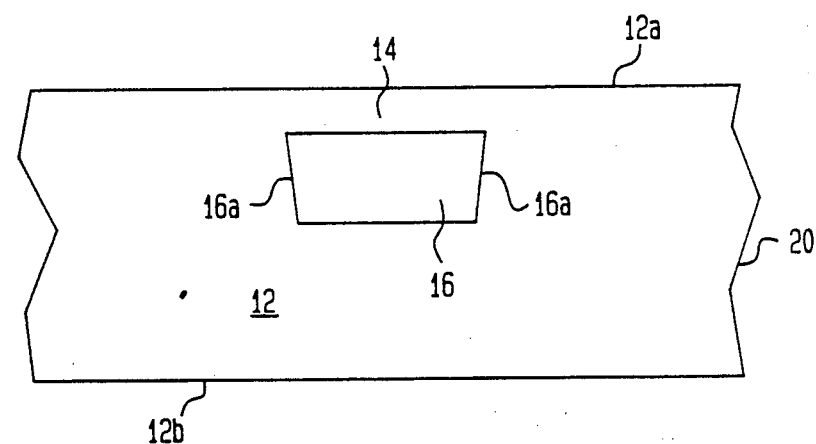

After the removal of the original masking layer 24, the structure shown in FIG. 2G results. It comprises a monocrystalline silicon chip 12 which is still a portion of wafer 20 and that includes a sealed and buried cavity 16 below the front surface 12a to define diaphragm portion 14. Wafer 20 is then cut up into individual chips 12.

Thereafter, in the usual fashion, the wafer is processed to form strain gages 18 (shown in FIG. 1) in the diaphragm portion 14 and other surrounding circuit elements 19 (shown in FIG.1) to achieve the structure originally described and shown in FIG. 1.

Finally the wafer would be cut up in the usual fashion to form individual chips and these would be further processed as needed to serve their desired system function.

It can be appreciated that the technique described provides a technique for forming a buried cavity in a monocrystalline semiconductive chip to define a diaphragm portion, coextensive with an underlying cavity, that has a thickness that may be only a small fraction of that of the chip.

It should also be evident that the specific parameters of the illustrative embodiment described are not critical and may be varied as desired. In particular, the specific materials described for the wafer and the various masking layers employed, and the particular etching and epitaxial growth system described can be varied consistently with the broad principles involved without departing from the spirit and scope of the invention. Still further, the semiconductive body 12 and the diaphragm portion 14 can be of n-type conductivity. A lateral p-n-p bipolar transistor, with the n-type diaphragm portion 14 serving as the base, could be formed in the diaphragm portion 14 instead of the stain gages 18. Such a p-n-p transistor would have lower substrate leakage than a conventional lateral p-n-p in which an n-type epitaxial layer, which serves as the base of the transistor, is formed on a p-type substrate. As such the resulting structure is an integrated circuit which does not have to be a pressure sensor. Various other bipolar or other types of semiconductive devices could be substituted for strain gages or used with strain gages.

The embodiments of the invention in which an exclusive property or privilege are claimed are defined as follows:

1. A process for forming a buried cavity in a monocrystalline semiconductive chip comprising the steps of:
    forming over a first surface of a semiconductive chip a first masking layer including an opening exposing a limited portion of said first surface;
    etching a moat in said first surface using an etchant that etches at a faster rate in the vertical direction normal to the first surface than in the lateral directions parallel to said first surface;
    forming a second masking layer on the side walls and bottom of said moat;
    selectively removing the second masking layer from the bottom of the moat;
    etching the chip to add to the depth of the moat and to widen the lateral dimensions while leaving an intact neck portion along the added depth of the moat;
    removing the remaining second masking layer from the side walls of the moat; and
    depositing semiconductive material to fill the intact neck portion of the moat with epitaxial monocrystalline material so as to define a buried cavity within the chip.

2. The process of claim 1 in which the chip is of silicon and the first and second masking layers are of silicon oxide.

3. The process of claim 1 in which the chip is of silicon, the first masking layer is of silicon nitride and the second masking layer is of silicon oxide.

4. The process of claim 1 in which the chip is of silicon, the first masking layer comprises a composite layer of silicon dioxide and silicon nitride and the second masking layer is of silicon dioxide.

5. The process of claim 1 in which at least one strain gage is formed in a portion of the first surface overlying the moat.

6. A process in which:
    a monocrystalline silicon wafer is provided on a first surface with a layer of a masking material;

a small hole is formed in the masking layer to expose the underlying silicon surface at each location where it is desired to form a diaphragm portion in the silicon wafer;

a moat is formed in the wafer aligned with each hole in the mask by an etchant that etches faster in the thickness direction of the wafer than in the lateral directions with little undercutting of the layer of masking material;

the wafer is treated to form an oxide on the surface of each moat including both its side walls and its bottom;

the wafer is treated to remove the oxide selectively from the bottom of each moat while leaving it along the side walls;

the wafer is etched to deepen each moat and to widen its lateral dimensions where unprotected by the oxide layer on the side walls;

the wafer is treated to remove the oxide remaining in each moat; and the top of each moat is closed off by epitaxial monocrystalline silicon material to form part of a diaphragm layer overlying a buried cavity comprising part of the moat.

7. The process of claim 6 in which piezoresistive strain gages are formed in a portion of each diaphragm layer.

8. A process for forming a pressure sensor comprising the steps of:

forming an aperture in a masking layer which covers a first surface of a monocrystalline silicon body to expose the underlying silicon surface at each location where it is desired to form a diaphragm portion in the silicon body;

etching a moat in the silicon body at each location below an aperture in the masking layer with an etchant that etches faster vertically through the silicon body than in lateral directions;

forming a silicon oxide on side walls and a bottom surface of each moat;

removing the silicon oxide from the bottom surface of each moat while leaving it on the side walls of each moat;

etching the exposed silicon at the bottom surface of each moat to deepen each moat and widen its lateral dimensions;

removing the silicon oxide remaining in each moat;

filling a top portion of each moat with monocrystalline silicon to define a buried cavity having a lateral extent which defines a surface of a monocrystalline overlying diaphragm layer; and forming at least one pressure sensitive device in a portion of the diaphragm layer.

* * * * *